United States Patent

[11] 3,627,909

[72] Inventors Thomas P. L. Liu;
Ho-Chol Lee, both of Liverpool, N.Y.
[21] Appl. No. 6,446
[22] Filed Jan. 28, 1970
[45] Patented Dec. 14, 1971
[73] Assignee General Electric Company

[54] COHERENT COLOR GENERATOR FOR LIGHT VALVE PROJECTION SYSTEM
9 Claims, 3 Drawing Figs.

[52] U.S. Cl. .................... 178/5.4 BD, 178/69.5 TU
[51] Int. Cl. .................... H04n 9/16
[50] Field of Search .................... 328/41, 72, 48, 63; 307/225; 331/51; 178/69.5 G, 5.4 BD; 179/15 BS; 235/92.57

[56] References Cited
UNITED STATES PATENTS
3,325,592 6/1967 Good et al. .................... 178/5.4 BDP
3,401,343 8/1968 O'Lear .................... 307/225

*Primary Examiner*—Robert L. Griffin
*Assistant Examiner*—Donald E. Stout
*Attorneys*—Marvin Snyder, W. J. Shanley, Jr., Frank L. Neuhauser, Oscar B. Waddell and Joseph B. Forman

ABSTRACT: Radio frequency carrier signals to establish optical diffraction gratings of predetermined spatial frequency for each primary color respectively employed in a light valve are generated by a gated master oscillator and frequency divider apparatus. The carrier frequency ratios are constant, and all oscillations begin simultaneously from a zero crossing, with full amplitude oscillation occurring immediately at the outset. Phase alternation at vertical field rate is introduced in one of the carrier signals to alternately establish diffraction gratings oriented in the same direction and having identical spatial frequency but opposite spatial phase in order to minimize optical beat frequencies between the first and second diffraction gratings.

INVENTORS:
THOMAS P.L. LIU,
HO-CHOL LEE,
BY Marvin Snyder
THEIR ATTORNEY.

INVENTORS:
THOMAS P. L. LIU,
HO-CHOL LEE,

BY Marvin Snyder
THEIR ATTORNEY.

COHERENT COLOR GENERATOR FOR LIGHT VALVE PROJECTION SYSTEM

This invention relates to signal generators, and more particularly to color carrier frequency generation apparatus for a light valve projection system.

A light valve suitable for optical projection of electronically generated images onto a remote display surface comprises, in a preferred embodiment an evacuated enclosure containing an electron gun in predetermined alignment with a transparent disc. The disc is rotated through a reservoir of light modulating fluid to deposit a continuously replenished layer of fluid on the disc surface. An electron beam, generated by the electron gun, is scanned across a portion of the light modulating fluid layer by electrostatic beam deflecting and focusing means, so as to selectively deform the layer. The fluid deformations thus formed constitute optical diffraction gratings which, in conjunction with a Schlieren optical system, selectively control passage of light from a light source through the disc and through an output window in the enclosure envelope in order to create visible images at a remote display surface on which the light impinges.

The aforementioned diffraction gratings are formed by directing electron beam onto the fluid layer and horizontally deflecting the beam across the surface of the layer in successive, substantially parallel paths. By velocity modulating the beam with signals corresponding to two primary colors, typically red and blue, the speed of horizontal deflection along these paths is varied in a periodic manner at a frequency much greater than the frequency of occurrence of each scan line or parallel path, producing vertically directed diffraction gratings corresponding to the red and blue signals, respectively. In addition, horizontally directed diffraction gratings, corresponding to the green signal, are formed by the horizontal scan lines or parallel paths of the scanning electron beam. The horizontally directed diffraction gratings are wobble-modulated; that is, the size of the spot formed by the beam is varied in accordance with green signal modulation.

The line-to-line spacing of each diffraction grating formed on the fluid layer respectively produces a specific angle of light deviation unique to any given color in light impinging on the fluid layer, enabling projection of three primary colors from the one common layer of viscous fluid. Light emerging from the diffraction gratings is directed onto an output mask having apertures therein of predetermined extent and at predetermined locations in order to pass the primary colors selected to be projected. The correct width and location of the cooperating slot in the output mask to pass the respective primary color when a diffraction grating corresponding to production of that color has been formed in the fluid layer, is determined by the line-to-line spacing of the diffraction grating thus formed. The spatial frequency of each of the three primary color diffraction gratings, which corresponds to the inverse of the line-to-line spacing of each of the respective gratings, is determined by the wavelength of the respective color to be passed. Diffraction gratings corresponding to these wavelengths may be established by controlling the electron beam to produce the gratings at the proper spatial locations on the fluid layer. Depth of fluid layer deformation in each diffraction grating is varied in accordance with density of charge deposited by the electron beam so as to produce corresponding variations in intensity of light passed by the respective gratings. A system of this type is described and claimed in W. E. Good et al. U.S. Pat. No. 3,325,592, issued June 13, 1967 and assigned to the instant assignee.

In order to operate a light valve of the type described in the aforementioned Good et at. patent consistently and with proper color purity, it is essential that the diffraction gratings be consistently formed with precisely the correct spatial dimensions. This requires that the electron beam, as it is scanned horizontally, produce vertical diffraction gratings as a result of periodic negative charge deposition at precisely spaced locations along each horizontal scan path. Conveniently, both red and blue diffraction gratings may be formed in this manner by superimposing a first carrier frequency, to produce blue diffraction gratings, onto the horizontal deflection voltage waveform which is typically of sawtooth configuration. Modulation of this type is known as velocity modulation. In addition, a green diffraction grating is formed by controlling the scanning beam with a third carrier frequency so that the natural grating formed by the horizontal deflection paths of the electron beam comprises the green grating. Modulation of the green grating is accomplished by spreading out, or smearing, in a vertical direction, the scanning electron beam, so as to vary the concentration of charge in a line along the center of the scanning direction. For minimum modulation of green, representing the green dark field, the natural grating is virtually wiped out. Conversely, the full natural grating itself represents maximum green modulation.

Because of the exact relationship of color to electromagnetic energy wavelength, the desired frequency ratios of each of the red and blue carrier signals to the green carrier signal must be maintained as precisely as possible; otherwise, color representation in the displayed image become inaccurate. Moreover, it has been found that when the phase of either the red or blue carrier wave, at initiation of each line of scan, varies from line-to-line, the vertically aligned deposits of charge forming the lines of the red or blue diffraction gratings lose their alignment in a single field or in successive fields. This results in a tearing of the primary colors in the projected image. It has also been found that an effect resembling a herringbone pattern results when the phase of the green carrier wave, at initiation of horizontal scan, varies from one line to another.

By maintaining the phase of each of the red and blue carrier waves constant, it has been found that the backgrounds of displayed images have a finely sectioned or checkered pattern. This is caused by the beat frequency produced by the red and blue carrier frequencies. That is, if the red carrier frequency if 16 MHz. and the blue carrier frequency if 12 MHz., a difference or beat frequency of 4 MHz. results. This 4 MHz. beat frequency lies in the higher frequency portion of the band of video frequencies. Therefore, signals at the beat frequency appear as fine alterations of dark and light, arranged in a regular pattern along the horizontal direction of scan. In the aforementioned W. E. Good et al. patent, means for overcoming the problem arising from the beat frequency are disclosed and claimed. Briefly, this involves inclusion of a phase reverser which functions to reverse the phase of the red frequency source in every other field so that, for example, during even-numbered fields, the red grating is formed by a carrier wave of 0° phase and, during odd-numbered fields, the red grating is formed by a carrier wave of the same frequency but 180° phase. This mode of operation effectively doubles the frequency producing the difference frequency pattern so as to eliminate the pattern from view.

Accordingly, one object of the invention is to provide apparatus for dividing a sinusoidal signal into signals of exact submultiple frequencies and constant phase.

Another object is to maintain alternate constant phase relationships between signals generating red and blue optical diffraction gratings for alternate, equal duration intervals, respectively.

Another object is to maintain a constant phase for each signal generating a red, blue and green optical diffraction grating, respectively, within each interval in which an image frame is generated.

Briefly, in accordance with a preferred embodiment of the invention a system for generating coherent radio frequency carrier signals to establish optical diffraction gratings of predetermined spatial frequency for each respective primary color utilized in images to be optically projected onto a remote display surface by directing light onto the diffraction gratings formed in a raster generated by a scanning electron beam so as to modulate the light with information requisite to formation of these images, comprises a sinusoidal oscillator and frequency divider means coupled to the oscillator. A set pulse generator, actuated upon completion of each horizontal scan of the electron beam, is coupled to each of the frequency divider means so as to reset each of the divider means and ensure that output signals produced thereby all begin at a common desired phase angle. Gating means are provided for maintaining the oscillator disabled during each interval in which the set pulse generator resets the frequency divider means.

BRIEF DESCRIPTION OF THE DRAWINGS

The features of the invention believed to be novel are set forth with particularity in the appended claims. The invention itself, however, both as to organization and method of operation, together with further objects and advantaged thereof, may best be understood by reference to the following description taken in conjunction with the accompanying drawings in which:

FIG. 3 is a detailed block diagram of another portion of the system shown in FIG. 1.

DETAILED DESCRIPTION OF THE INVENTION

Figure 1:
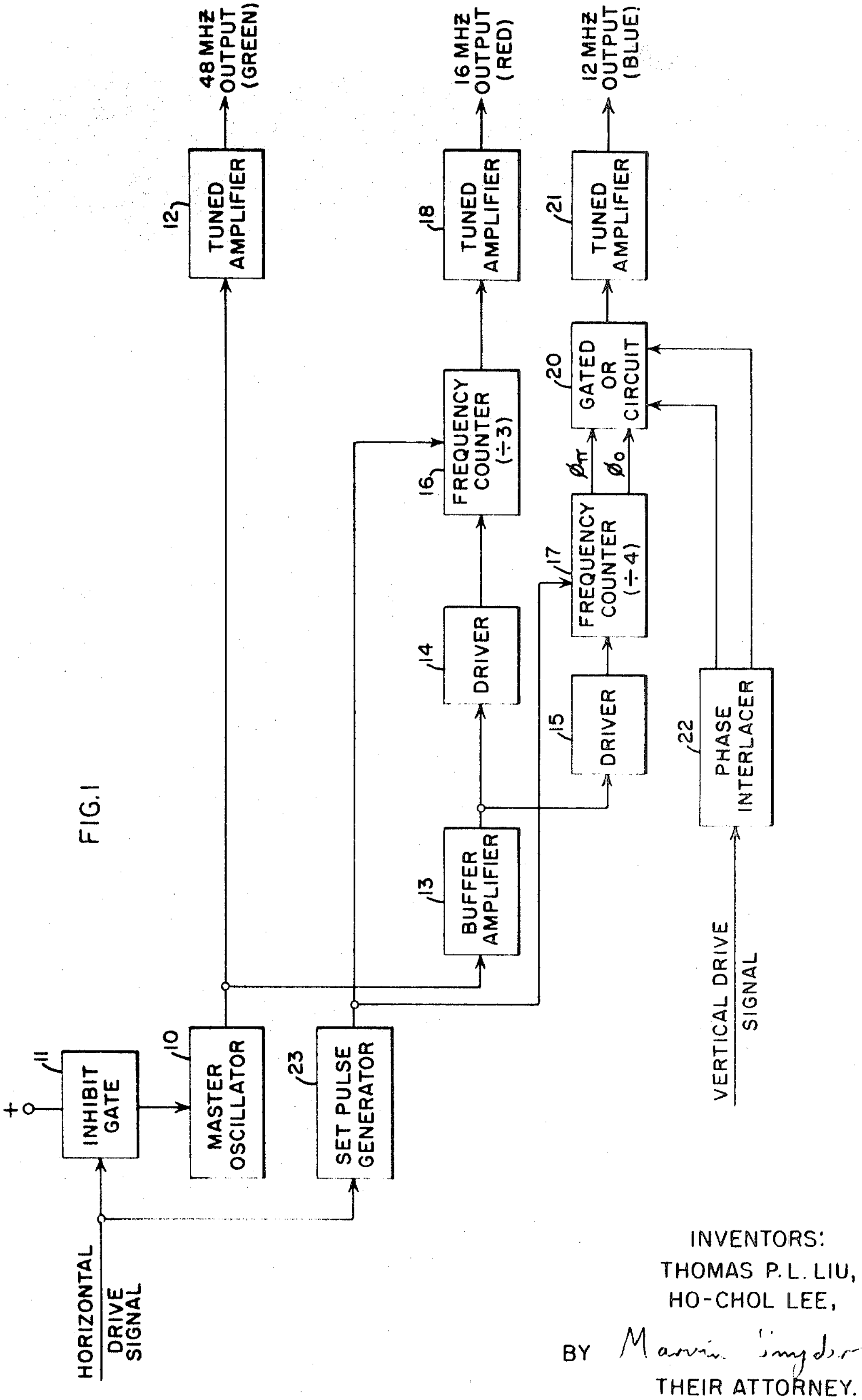
FIG. 1 is a block diagram of one embodiment of the coherent color carrier signal generator of the instant invention.

In FIG. 1, a master oscillator 10, producing a 48 MHz sinusoidal output signal, is controllably energized through an INHIBIT gate circuit 11 in response to horizontal drive signals originating within the receiver circuitry furnishing video signals to a light valve. Output signals from master oscillator 10 are supplied through an amplifier 12 which is tuned to the output frequency of the oscillator. In addition, output signals from master oscillator 10 are furnished through a buffer amplifier 13 to each of a pair of driver stages 14 and 15, respectively. Each of driver stages 14 and 15 may comprise a power amplifier in order to produce sufficient current to drive a frequency counter 16 and 17, respectively. Each of counters 16 and 17 is preferably comprised of a pair of flip-flop stages connected to produce an output pulse after receiving a predetermined plurality of input pulses.

Counter 16 is a divide-by-three counter, producing an output pulse for every three input pulses supplied thereto, while counter 17 is a divide-by-four counter, producing one output pulse for every four input pulses supplied thereto. Thus, the pulse repetition frequency of the signal produced by frequency counter 16 is 16 MHz. while the pulse repetition frequency of the output signal produced by frequency counter 17 is 12 mhz. Output signals produced by frequency counter 16 are supplied at constant phase through a tuned amplifier 18. By employing circuitry resonant at 16 MHz. in tuned amplifier 18, the pulses produced by frequency counter 16 are converted from a substantially rectangular configuration to a sinusoidal configuration.

Frequency counter 17 concurrently produces a pair of signals at identical frequency, but shifted in phase from each other by 180°. Each of the phase-shifted signals produced by frequency counter 17, designated $\Phi_0$ and $\Phi_\pi$, is furnished to a separate input of a gated OR-circuit 20, respectively. At any given time, one or the other of the output signals produced by frequency counter 17 is passed by gated OR-circuit 20 through an amplifier 21 tuned to a frequency of 12 mhz. Because of the resonant circuitry in tuned amplifier 21, the substantially rectangular pulses furnished by frequency counter 17 through gated OR-circuit 20 are converted to a sinusoidal configuration. Thus, the output signals of each of tuned amplifiers 12, 18 and 21, at frequencies of 48 MHz., 16 MHz. and 12 MHz., respectively, are furnished to separate green, red and blue modulators (not shown), respectively, wherein they are amplitude modulated in the manner described and claimed in the aforementioned W. E. Good et al. U.S. Pat. No. 3,325,592. Frequency counters 16 and 17 are each reset to an initial condition of zero by a narrow pulse produced by a set pulse generator 23 in response to a horizontal drive signal or horizontal flyback pulse. This ensures phase coherency of each of the three primary color signals generated in the light valve as the electron beam therein scans from one horizontal line to the next.

Selection of one or the other signals produced by frequency counter 17 is controlled by a phase interlacer 22 actuated by the vertical drive signal from the video receiver circuitry. Typically, phase interlacer 22 comprises a flip-flop circuit which, upon receipt of each vertical drive pulse, alternates it output condition. As this output condition alternates, passage of one or the other of the two output signals produced by frequency counter 17 is selected by gated OR-circuit 20.

In operation, horizontal scanning by the light valve electron beam of each line in the raster containing the image to be displayed is preceded by a horizontal flyback pulse, corresponding to a horizontal drive signal. During occurrence of this signal, INHIBIT-gate 11 switches to its highly nonconductive state, thereby interrupting energization of master oscillator 10. During this same interval, a set pulse is produced by set pulse generator 23, causing the count in each of frequency counters 16 and 17 to be reset to zero.

Upon completion of the horizontal flyback pulse interval, INHIBIT-gate 11 switches back to its conductive state, so that master oscillator 10 is once again energized. At this time, a 48 MHz. output signal is driven by sinusoidal signals furnished from drivers 14 and 15, respectively. The signals furnished from drivers 14 and 15 begin at zero amplitude simultaneously with the 48 MHz. signal generated by oscillator 10, thereby maintaining phase coherency. A signal of 16 MHz. pulse repetition frequency is furnished by frequency counter 16 to tuned amplifier 18, wherein it is converted to a signal of sinusoidal configuration. In similar fashion, a signal of constant phase and 12 MHz. pulse repetition frequency is furnished from frequency counter 17 through gated OR-circuit 20 to tuned amplifier 21, wherein it is converted from substantially rectangular configuration to sinusoidal configuration. In this fashion, a green, red and blue carrier signal of 48 MHz. 16 MHz. and 12 MHz. frequency, respectively, is produced for modulation by the green, red and blue video signals, respectively, to produce an image for display in color.

After completion of each scan of a horizontal line, operation of master oscillator 10 is halted by the action of INHIBIT gate 11 in response to the horizontal drive signal signifying start of a horizontal flyback period. After completion of each horizontal flyback period, however, operation of master oscillator 10 is resumed, and the respective color carrier signals are produced by tuned amplifiers 12, 18 and 21.

As each horizontal line is scanned, the output signal produced by frequency counter 17 is of phase $\Phi_0$. This phase remains constant until a raster corresponding to one complete field has been generated, constituting one-half of a frame. At this time, horizontal scanning is halted by occurrence of the horizontal drive signal and the vertical drive signal concurrently returns the electron beam from the bottom of the raster to the top. The vertical drive or flyback also actuates phase interlacer 22, reversing the state of the interlacer. As a result, the condition of gated OR-circuit 20 is reversed and, once horizontal scanning is resumed, signals of phase $\Phi_\pi$ are produced by frequency counter 17, instead of signals of phase $\Phi_0$. A new field is then generated. After completion of this new field, the vertical drive signal again actuates phase interlacer 22 so as to reverse its condition and once again select signals of phase $\Phi_0$ for application by frequency counter 17 through gated OR-circuit 20 to tuned amplifier 21. Therefore, it can be seen that phase of the output signal produced by frequency counter 17 reverses with each successive field, and the sinusoidal blue grating generation signal reverses phase accordingly. If desired, however, the red grating generation signal may be reversed in phase reversal, as pointed out in the aforementioned Good et al. U.S. Pat. No. 3,325,592, is to overcome the problem resulting from the beat frequency extant between the spatial frequencies of the vertically oriented blue and red optical diffraction gratings.

The apparatus illustrated in he system of FIG. 1 permits each of the grating frequency sources to begin oscillating simultaneously at the start of each horizontal scan, and each to begin from a zero crossing, regardless os phase of the signal produced by frequency counter 17. In addition, since the frequency counters function as frequency dividers, producing signals of respectively different submultiple pulse repetition frequencies of 48 MHz., the pulses produced thereby are all of uniform depth, when unmodulated, permitting accurate representation of intensity variation in images displayed by the light valve. The counters, moreover, assure that the frequency ratios of the green to red to blue grating frequency sources are exactly 1:1/4:1/3, respectively, thereby providing for accurate representation of color in images displayed by the light valve.

Figure 2:
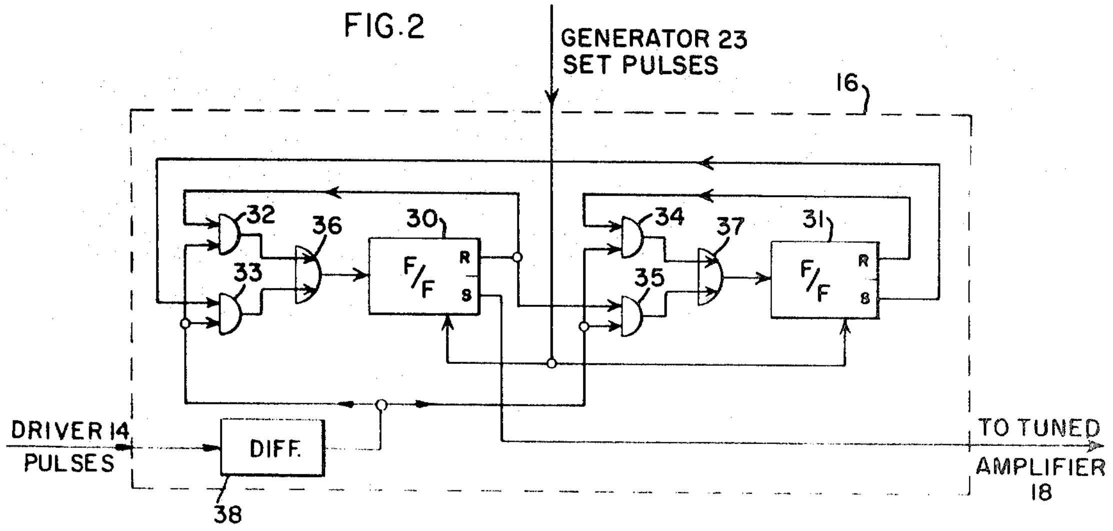
FIG. 2 is a detailed block diagram of a frequency counter which may be employed in the system shown in FIG. 1.

FIG. 2 is a detailed block diagram of frequency counter 16 employed in the system of FIG. 1. Frequency counter 16 comprises first and second flip-flop or bistable multivibrator circuits 30 and 31. Sinusoidal pulses from driver 14, shown in FIG. 1, are furnished to a differentiator circuit 38 wherein the leading edge of each driver pulse is differentiated. The differentiated pulse is applied to one input of each of 2-input AND-gates 32, 33, 34 and 35. A second input of each of AND-gates 32 and 35 is energized by the reset output, designated R, of flip-flop circuit 30, while a second input of AND-gate 34 is energized by the reset output of flip-flop circuit 31. The second input of AND-gate 33 is energized by the set output, designated S, of flip-flop circuit 31.

Output signals from each of AND-gates 32 and 33 are furnished, respectively, to each of the two inputs of a 2-input OR-gate 36, while each of the outputs and AND-gates 34 and 35 is coupled to a respective input of a 2-input OR-gate 37. Flip-flop circuit 30 is driven by output signals form OR-gate 36 while flip-flop circuit 31 is driven by output signals from OR-gate 37. Each of flip-flop circuits 30 and 31 is switched, in common, to its set condition by set pulses received from set pulse generator 23 employed in the system of FIG. 1. Output signals form frequency counter 16 are furnished to tuned amplifier 18, shown in FIG. 1, from the set output of flip-flop circuit 30.

In operation, each of flip-flop circuits 30 and 31 is switched to its set condition by a set pulse from set pulse generator 23. This occurs during the horizontal flyback interval of the scanning electron beam in the light valve, so that the master oscillator of the system is disabled at that time, After the set pulse generator 23 output pulse is terminated, each flip-flop circuits 30 and 31 is in the set condition. Thereafter, upon completion of the horizontal drive signal, master oscillator 10, shown in FIG. 1, resumes operation, so that short-duration pulses from differentiator 38, representing the leading edge of pulses from driver 14, also shown in FIG. 1, are furnished to one input of each of AND-gates 32–35 of frequency counter 16. Each time an input signal is received by either a flip-flop circuit form the OR gate coupled thereto, the flip-flop circuit switches from the state it is in, to its opposite state. This switching is initiated upon occurrence of the leading edge of the drive pulse, due to the differentiation taking place in differentiator 38, and requires a length of time exceeding duration of the differentiator output pulse. As a result, output pulses from the set output of flip-flop circuit 30 are produced at exactly one-third the frequency of the system master oscillator. That this is so may be seen from table I, which illustrates the sequential logical operations of frequency counter 16. In the table, a 1 represents existence of a first, positive voltage level, while a 0 represents existence of a first, positive voltage level, such as zero. Only a 1 pulse can fulfill an input to an AND- or OR gate and only a 1 pulse is capable of driving a flip-flop circuit from one state to another. All switching of the flip-flop states is initiated upon occurrence of the leading edge of driver 14 pulses; that is, whenever the 1 state of a driver 14 pulse is initiated. The duration of this leading edge is but a small fraction of the duration of the 1 state of each driver pulse.

TABLE I

| Flip-flop states | | Hor. drive interval | Driver, 14 pulses | | | | | |
|---|---|---|---|---|---|---|---|---|
| | | | 1 | 2 | 3 | 4 | 5 | 6 |
| F/F 30 | S | 1 | 0 | 1 | 1 | 0 | 1 | 1 |
| | R | 0 | 1 | 0 | 0 | 1 | 0 | 0 |
| F/F 31 | S | 1 | 1 | 0 | 1 | 1 | 0 | 1 |
| | R | 0 | 0 | 1 | 0 | 0 | 1 | 0 |

Thus, it is evident from table I that during the span of six consecutive pulses from driver 14, flip-flop circuit 30 us switched into its set condition twice. Since the logic set forth in the above table repeats itself after every six pulses from driver 14, it is evident that frequency counter 16 comprises a divide-by-three circuit. The pulses furnished to tuned amplifier 18 are, as can be determined from the above table, negative-going; however, if positive-going pulses are desired, the output signal of frequency counter 16 may be taken from the reset output of flip-flop circuit 30 instead. Moreover, table I also shows that the first output pulse produced by frequency counter 16 is initiated immediately upon initiation of the first output pulse from driver 14 following termination of the horizontal drive interval. As a result, the 16 MHz. output signal furnished by the system illustrated in FIG. 1 is maintained in precise, constant phase relationship with the 48 MHz. output signal produced by the system.

Figure 3:
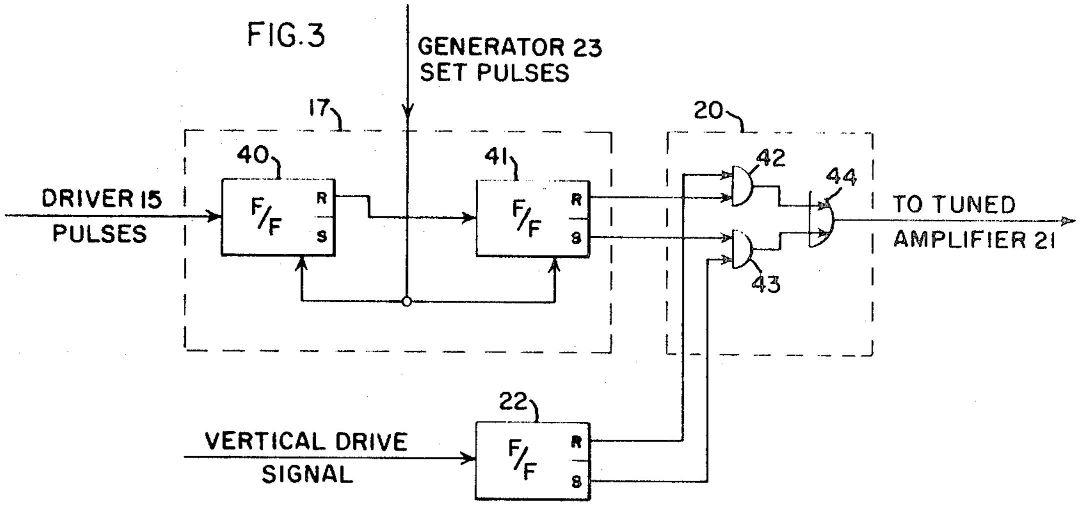
FIG. 3 is a detailed block diagram of a frequency counter which may be employed in the system shown in FIG. 1.

FIG. 3 is a detailed block diagram of frequency counter 17, gated OR-circuit 20, and phase interlacer 22, employed in the system of FIG. 1. Frequency counter 17 comprises a pair of flip-flop circuits or bistable multivibrators 40 and 41, with flip-flop circuit 40 driven by output pulses from driver 15, shown in the system of FIG. 1, and flip-flop circuit 41 driven by output signals from the reset terminal of flip-flop circuit 40. Each of flip-flop circuits 40 and 41 is switched into its set condition by an output pulse from set pulse generator 23, shown in FIG. 1, occurring during each horizontal flyback interval for the light valve electron beam. This switching is initiated upon occurrence of the leading edge of the input pulse applied to the input of each flip-flop circuit, respectively, and requires a length of time exceeding duration of the differentiator output pulse.

Gated OR-circuit 20 may comprise a pair of 2-input AND-gates 42 and 43, the output of each coupled to a separate input, respectively, of a 2-input OR-gate 44. A first input of AND-gate 42 is energized by the reset output of flip-flop circuit 41, while a first input of AND-gate 43 is energized by the set output of flip-flop circuit 41. Since output signals from the reset and set outputs of flip-flop circuit 41 are 180° out of phase with each other, the output signal produced by the reset terminal is designated $\Phi_{\pi}$, while the output signal produced by the set terminal is designated $\Phi_0$.

Phase interlacer is illustrated as comprising a flip-flop circuit responsive to the vertical drive signal, or vertical flyback pulse, produced in the receiver circuitry driving the light valve, and having its reset terminal coupled to the second input of AND-gate 42 and its set terminal coupled to the second input of AND-gate 43. Output signals form OR-gate 44 are supplied to tuned amplifier 21 of the system shown in FIG. 1.

During the horizontal flyback interval, a set pulse is furnished to flip-flop circuits 40 and 41 from set pulse generator 23 of the system shown in FIG. 1. Flip-flop circuit 22 may be in either state, herein assumed to be in its set condition.

Upon completion of the set pulse from generator 23, driver 15 begins supplying pulses to flip-flop circuit 40. Operation of flip-flop circuits 40 and 41 is illustrated in table II, wherein each 1 and 0 conveys the same meaning as set forth in table I, and wherein all switching of the flip-flop states if initiated upon occurrence of the leading edge of driver 15 pulses.

TABLE II

| Flip-flop states | | Hor. drive interval. | Driver, 15 pulses 1 | 2 | 3 | 4 | 5 | 6 |
|---|---|---|---|---|---|---|---|---|
| F/F 40 | S | 1 | 0 | 1 | 0 | 1 | 0 | 1 |
| | R | 0 | 1 | 0 | 1 | 0 | 1 | 0 |
| F/F 41 | S | 1 | 0 | 0 | 1 | 1 | 0 | 0 |
| | R | 0 | 1 | 1 | 0 | 0 | 1 | 1 |

Thus, flip-flop circuit 41 changes it s state half as frequently as flip-flop circuit 40, while flip-flop circuit 40 changes it state at a frequency one-half the frequency of pulses from driver 15. Accordingly, frequency counter 17 comprises a divide-by-four counter.

Because both the reset terminals of flip-flop circuit 41 are connected to gated OR-circuit 20, flip-flop circuit 22 provides facility for selecting pulses at the output of either the reset or set terminals of flip-flop circuit 41 to be furnished to tuned amplifier 21. With flip-flop circuit 22 in the set condition, both inputs of AND-gate 43 are energized each time a pulse is produced at the set output terminal of flip-flop circuit 41, so that these pulses, corresponding to signal $\Phi_0$, are furnished through OR-gate 44 to tuned amplifier 21. Since the second input of AND-gate 42 is not energized by an output signal from flip-flop circuit 22, pulses at the reset terminal of flip-flop circuit 41, corresponding to signal $\Phi_\pi$, are not furnished to tuned amplifier 21.

Upon completion of scanning of a vertical field by the light valve electron beam, a vertical drive signal, or vertical flyback pulse, is furnished to flip-flop circuit 22, changing its state. As a result, the second input of AND-gate 42 is not fulfilled by a signal from the reset output terminal of flip-flop circuit 22, while the second input of AND-gate 43 is no longer fulfilled by an output signal from the set terminal of flip-flop circuit 22. As a result, when pulses from driver 15 are resumed at the beginning of the next horizontal scan, pulses are furnished from the reset output terminal of flip-flop circuit 41 to the first input of AND-gate 42, and from the output of AND-gate 42 are furnished through OR-gate 44 to tuned amplifier 21. Thus, during this second image field, the pulses furnished from flip-flop circuit 41 to tuned amplifier 21 comprise signal $\Phi_\pi$. This signal, as evident from table II, is 180° out of phase with the signal at the set terminal of flip-flop circuit 41. In this fashion, therefore, the phase of the output signal furnished by gated OR-circuit 20 to tuned amplifier 21 is reversed upon initiation of each successive image field. Therefore, while the output signal produced by frequency counter 17 begins simultaneously with the output signal produced by frequency counter 16, the phase of the output signal furnished to tuned amplifier 21 reverses from one image field to the next, unlike the signals furnished to tuned amplifiers 12 and 18 as shown in the system of FIG. 1. The of this phase reversal, as pointed out previously, is to minimize optical beat frequencies caused by diffraction gratings formed in the light valve by the output signal of amplifier 18 having a frequency of one-third the master oscillator output signal frequency, and the output signal of tuned amplifier 21 having a frequency of one-fourth the master oscillator output frequency.

The foregoing describes apparatus for dividing a sinusoidal signal into exact submultiple frequencies and constant phase. The apparatus maintains alternate constant phase relationships between signals generating red and blue optical diffraction gratings for alternate, equal duration intervals, respectively, and maintains a constant phase for each signal generating a red, blue and green optical diffraction grating, respectively, within each interval, which corresponds to he interval in which an image field is generated.

While only certain preferred features of the invention have been shown by way of illustration, many modifications and changes will occur to those skilled in the art. It is, therefore, to be understood that the appended claims are intended to cover all such modifications and changes as fall within the true spirit of the invention.

We claim:

1. A system for generating coherent radio frequency carrier signals to establish, within a raster generated by a scanning electron beam, optical diffraction gratings of predetermined spatial frequency for each respective primary color utilized in images to be optically projected onto a remote display surface by directing light onto said diffraction gratings so as to modulate said light with information requisite to formation of said images, said system comprising:

- oscillator means producing a signal of substantially constant frequency;
- frequency divider means coupled to said oscillator means;
- pulse generator means coupled to said frequency divider means for resetting said frequency divider means to ensure that each output signal produced by said frequency divider means begins with full amplitude at a desired phase angle with respect to the signal produced by said oscillator means, said pulse generator means being actuated upon completion of each horizontal scan of said electron beam; and
- gating means coupled to said oscillator means for maintaining said oscillator means disabled during each interval in which said pulse generator means resets said frequency divider means.

2. The system of claim 1 wherein said frequency divider means comprises first and second frequency counters producing signals of respectively different submultiple frequencies of said substantially constant frequency, and said pulse generator means is coupled to each of said first and second frequency counters.

3. The system of claim 2 wherein said second frequency counter produces first and second output signals of identical frequency but opposite phase, said system further including means coupled to said second frequency counter for controllably selecting one or the other of said first and second output signals therefrom at a frequency rate corresponding to the frequency rate at which image fields are produced by said system for display.

4. The system of claim 2 including tuned amplified means coupled to said first and second frequency counters in order to produce a sinusoidal output signal.

5. The system of claim 3 including tuned amplifier means coupled to said first and second frequency counters in order to produce a sinusoidal output signal.

6. The system of claim 2 wherein each of said first and second frequency counters comprises a pair of bistable circuits, one bistable circuit of each pair of said bistable circuits producing output pulses from each of said first and second frequency counters respectively, each said one of said bistable circuits producing a first output pulse upon occurrence of each initial output signal cycle from said oscillator means.

7. The system of claim 1 including means coupled jointly to said pulse generator means and said gating means in order to prevent said oscillator means and said pulse generator means from operating simultaneously.

8. The system of claim 2 including means coupled jointly to said pulse generator means and said gating means in order to prevent said oscillator means and said pulse generator means from operating simultaneously.

9. The system of claim 6 wherein said one bistable circuit of said second frequency counter produces first and second output signals of identical frequency but opposite phase, said system further including means coupled to said one bistable circuit of said second frequency counter for controllably selecting one or the other of said first and second output signals therefrom at a frequency rate corresponding to the frequency rate at which image fields are produced by said system for display.

* * * * *